Aug. 19, 1930.  F. L. STANCLIFF  1,773,637
TOOL
Filed Sept. 3, 1929
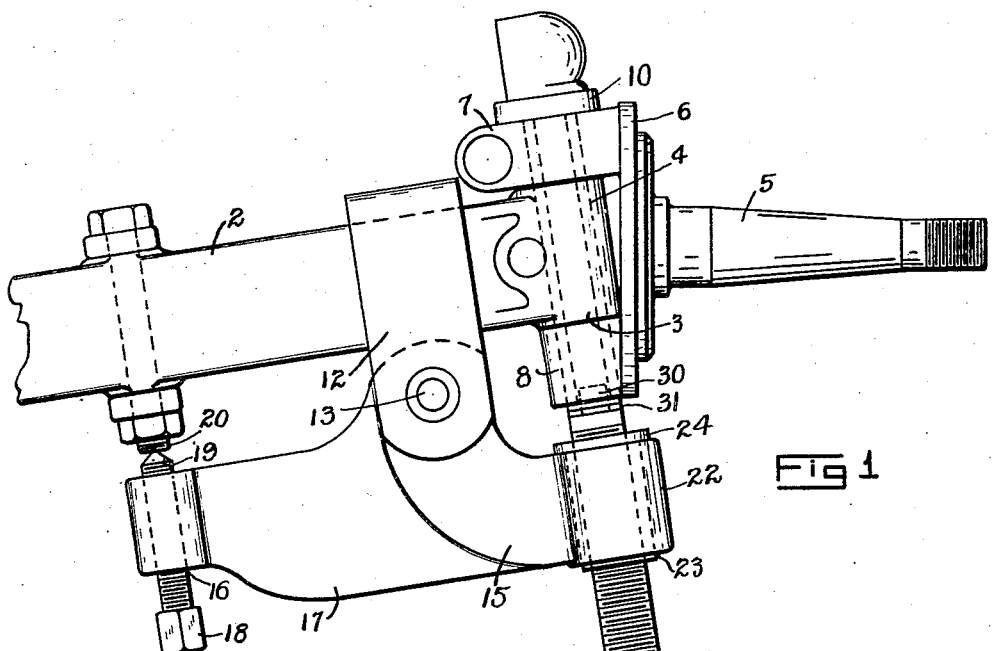
Fig 1
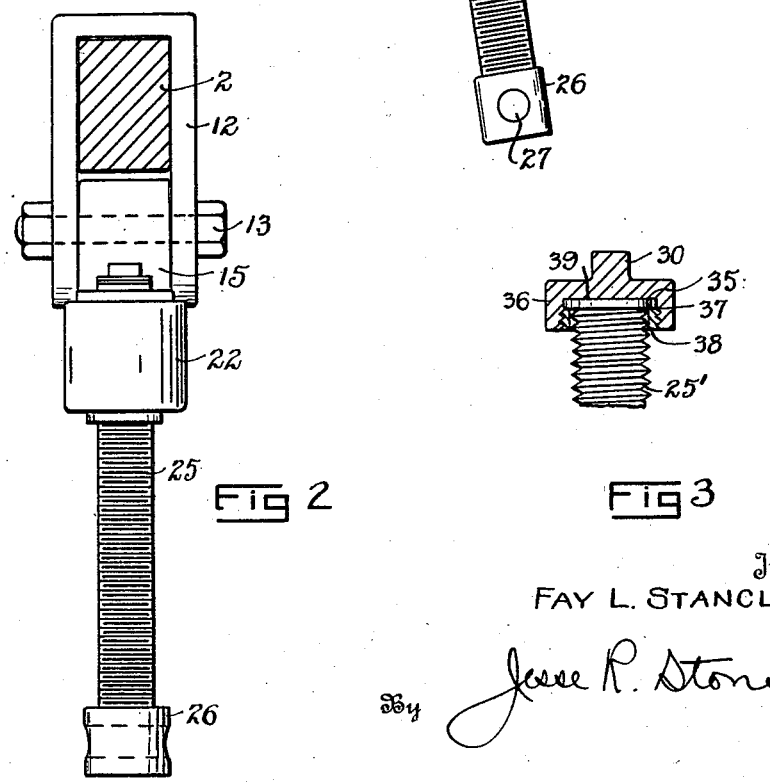
Fig 2
Fig 3
Inventor
FAY L. STANCLIFF
By Jesse R. Stone
Attorney Patented Aug. 19, 1930

1,773,637

UNITED STATES PATENT OFFICE

FAY L. STANCLIFF, OF HOUSTON, TEXAS

TOOL

Application filed September 3, 1929. Serial No. 389,972.

The invention relates to a tool or mechanism particularly adapted for removing bolts or spindles which have become lodged in a bearing or other support member.

The present improvement has been particularly designed for the purpose of removing spindles or bolts from the axles of certain types of automobiles. Its use, however, is not intended to be limited to this specific purpose as it seems obvious that other and various applications will arise to which the device may be applied with advantage.

It is one of the objects of the invention to provide a simple and economical structure to exert a thrust upon a spindle bolt.

Another object of the invention is to devise a tool adapted for connection to the car axle so that a pressure may be exerted upon the spindle bolt.

Still another object of the invention is to arrange the tool in such a manner that the thrust bolt may be adapted for alignment with the spindle bolt which is being removed.

Still another object of the invention is to devise a connection for the end of the spindle bolt which will permit rotation thereof without rotating the contact member on the end.

The invention will be readily understood when the following description is considered in connection with the accompanying drawing wherein—

Fig. 1 is a side elevation of my improved tool attached to the car axle in operative position.

Fig. 2 is an end elevation of the tool which has been connected with the car axle.

Fig. 3 is a sectional view showing a modification of the thrust bolt head which may be used.

By having reference to Fig. 1, an axle of an automobile has been shown at 2. This axle is of usual construction and has upon the end thereof an enlarged portion 3 having a central vertical passage 4 therethrough to receive the spindle bolt indicated generally at 10. This spindle bolt serves as a bearing or pivot for the wheel spindle 5. This wheel spindle comprises the flange 6 against which the wheel is adapted to abut and the upper bearing lug 7 and lower bearing lug 8. These lugs 7 and 8 are each provided with a central vertical opening which is adapted to align with the opening 4 in the axle 2. Thus the spindle 5 is adapted for turning movement to steer the car in a manner well understood.

In a great many instances, due to poor lubrication or to the manner in which the spindle bolt 10 has been inserted in the axle 2, it is next to impossible to remove the spindle bolt when the bearing lugs 7 and 8 or the end of the axle 2 become worn. In some types of cars this spindle bolt is inserted under pressure while heated and is therefore very difficult to remove. It is with the object of overcoming this difficulty that the present tool has been devised.

Fig. 1 shows the tool as connected to the axle by having the bracket 12 placed over the top of the axle and the bolt 13 inserted through suitable openings therein. This bolt 13 also passes through the body 15 of the tool so that the body will be restrained from downward movement with respect to the axle 2 by means of the clevis or bracket 12. The body 15 extends downwardly below the bolt 13 and has an outwardly extending arm 17. This arm has formed therein an opening 16 to receive the alignment screw 18. This screw has been shown pointed at 19 to engage against the axle 2 or the bolt 20 here illustrated. In certain makes of cars this bolt 20 serves to retain the end of the radius rod which serves as a brace for the axle. The body 15 extends in a direction opposite to the arm 17 and has an enlarged circular portion 22 which is formed with a central opening 23.

A threaded bushing or bearing 24 is arranged for insertion into the opening 23. This bushing 24 is readily removable so that a new one may be inserted when desired. The bushing 24 is adapted to receive the thrust bolt or rod 25 which is provided with an enlarged head 26 having an opening 27 to receive a rod or bar by which the bolt 25 is to be rotated. The upper end of the thrust bolt 25 may be formed as shown in Fig. 1 by being reduced in diameter at 30 to form a pilot or head. Upon this pilot may be inserted one or more washers 31 which are adapted to take the thrust of bolt 25 and take up the friction between the bolt 25 and the spindle bolt 10 which is being removed. The spindle bolt here illustrated is of hollow construction in order to provide for an operating bolt which is generally used in connection with the brakes on the wheel. The pilot head 30 is adapted for insertion into the lower end of this hollow spindle bolt 10 and the washers 31 are arranged to abut against the end of the spindle bolt.

The operation of the tool is as follows: The bracket or clevis 12 is attached to the axle and the alignment screw 18 adjusted to bring the thrust bolt 25 into alignment with the spindle bolt 10. The thrust bolt 25 is then advanced by rotation until the pilot 30 enters the lower end of the opening in the spindle bolt 10. Continued rotation causes the bracket 12 to be brought down to engage with the axle 2 and in this manner a direct pressure may be exerted upon the lower end of the spindle bolt so that it may be extruded or thrust from the lug 8, the opening 4 and the lug 7.

Fig. 3 shows a modified form of the head for the spindle bolt 25. This form includes the spindle bolt 25' which has an enlarged head 35 formed thereon. A cap 36 is formed with a pilot 30 thereon and has a recess 37 in the bottom thereof. This recess is threaded and adapted to receive the head 35 of the thrust bolt 25'. A lock ring 38 is shown as threaded into the opening 37 to prevent the head 35 from being removed. In this manner the cap 36 is adapted for rotation with respect to the thrust screw 25' and the pressure exerted by the screw will be against the face 39 of the cap.

I have disclosed herein an embodiment of my present improvement which I believe to be entirely satisfactory and practical for the purposes in view. Nevertheless it is to be understood that the several essential parts of the improved embodiment might be constructed in various other alternative forms, and it is to be understood that in the further development of the device that I reserve the privilege of resorting to all such legitimate changes therein as may be fairly embodied within the spirit and scope of the invention as claimed.

What I claim as new is:

1. A tool of the character described including an axle bracket, a body member, a thrust bolt bearing at one end of said body member and an alignment screw at the opposite end thereof, and a thrust bolt carried by said bearing.

2. In a spindle bolt removing tool, a body, a bracket to attach said body to the car axle, an alignment screw carried by said body and adapted to engage the car axle, a thrust bolt bearing on said body whereby pressure may be exerted on the lower end of the spindle.

3. In a spindle bolt removing tool, a body, a bracket to attach said body to the car axle, an alignment screw carried by said body and adapted to engage the car axle, a thrust bolt bearing on said body whereby pressure may be exerted on the lower end of the spindle bolt, said thrust bolt being maintained coaxial with the spindle bolt by adjustment of said alignment screw.

4. In a tool for removing spindle bolts, means to connect the tool to the bolt bearing structure, a rod adapted to exert a thrust upon the spindle bolt, and a body structure connecting said means and said rod whereby the thrust on said rod is transmitted to the bolt bearing structure.

5. A spindle bolt removing tool including means to support said tool on the car axle, a body pivoted to said means, an adjustment screw carried by said body and adapted to contact the car axle whereby said body may be adjusted to a position substantially parallel with the axle, and a thrust bolt threaded through said body and arranged for alignment with the spindle bolt to be removed when said body is substantially parallel with the axle.

6. A spindle bolt removing tool including means to support said tool on the car axle, a body pivoted to said means, an adjustment screw carried by said body and adapted to contact the car axle whereby said body may be adjusted to a position substantially parallel with the axle, and a thrust bolt threaded through said body and arranged for alignment with the spindle bolt to be removed when said body is substantially parallel with the axle, and means rotatable on the head of said thrust bolt.

7. A tool for removing spindle bolts including a body member, a bolt threaded through said member adjacent each end thereof, one of said bolts being adapted to contact the spindle bolt and the other being adapted to contact the car axle, and means intermediate said bolt and connected to the car axle and said body to take the thrust of said bolts and act as a fulcrum for said body.

8. A spindle bolt removing tool including a thrust bolt adapted to engage the spindle bolt, a bearing body through which said thrust bolt is threaded, means to support said body with respect to the car axle, and additional means to align said body with respect to the car axle so that said thrust bolt will rotate along the center line of the spindle bolt.

In testimony whereof I hereunto affix my signature this 26th day of August, A. D. 1929.

FAY L. STANCLIFF.